United States Patent

[11] 3,619,169

| [72] | Inventor | Warren H. Zick<br>Pittsburgh, Pa. |
|---|---|---|
| [21] | Appl. No. | 818,828 |
| [22] | Filed | Apr. 23, 1969 |
| [45] | Patented | Nov. 9, 1971 |
| [73] | Assignee | Velsicol Chemical Corporation<br>Chicago, Ill. |

[54] METHOD OF INCREASING THE RECOVERABLE SUGAR FROM SUGAR BEETS
7 Claims, No Drawings

[52] U.S. Cl. ......................................................... 71/107
[51] Int. Cl. ......................................................... A01n 9/24
[50] Field of Search ............................................. 71/115, 107

[56] References Cited
FOREIGN PATENTS
1,028,976  5/1966  Great Britain ................  71/115

OTHER REFERENCES
Nickell et al. Haw. Sugar Technol., 24th Annual Conference, Nov. 1965, pp. 152– 161

Primary Examiner—James O. Thomas, Jr.
Attorney—Robert J. Schwarz

ABSTRACT: This invention discloses a method of increasing the recoverable sugar from sugar beets which comprises contacting the beet plants with an effective amount of an alkyl ester of 2-methoxy-3,6-dichlorobenzoic acid.

METHOD OF INCREASING THE RECOVERABLE SUGAR FROM SUGAR BEETS

This invention relates to a method of increasing the yield of sugar from sugar beets. More particularly, this invention relates to a method of increasing the recoverable sugar in sugar beets by treating the sugar beet plants during their growing or maturing season with selected esters of dicamba.

variety of plant growth stimulants and promoters have been tried in the past in attempts to increase the yields of crops. These attempts have met with varying success but have generally not attained commercial significance. One particular crop which has been under investigation with the purpose of increasing yields in sugar beets. However, only insignificant results have been obtained even with such well-known plant stimulants as the gibberellins.

Surprisingly it has now been found that the recovery of sugar from sugar beets can be substantially increased through the use of alkyl esters of 2-methoxy-3,6-dichlorobenzoic acid. Thus, one embodiment of the present invention resides in a method of increasing the recoverable sugar from sugar beets which comprises contacting said sugar beets with an effective amount of an alkyl ester of 2-methoxy-3,6-dichlorobenzoic acid at least 2 weeks before harvest. In a preferred embodiment of the present invention the alkyl ester group of 2-methoxy-3,6-dichlorobenzoic acid has from one to 10 carbon atoms.

The alkyl esters of 2-methoxy-3,6-dichlorobenzoic acid are well-known in the art and their preparation is fully described in U.S. Pat. No. 3,013,054.

Examples of these esters are:
methyl 2-methoxy-3,6-dichlorobenzoate
ethyl 2-methoxy-3,6-dichlorobenzoate
propyl 2-methoxy-3,6-dichlorobenzoate
isopropyl 2-methoxy-3,6-dichlorobenzoate
butyl 2-methoxy-3,6-dichlorobenzoate
pentyl 2-methozy-3,6-dichlorobenzoate
hexyl 2-methoxy-3,6-dichlorobenzoate
heptyl 2-methoxy-3,6-dichlorobenzoate
octyl 2-methoxy-3,6-dichlorobenzoate
nonyl 2-methoxy-3,6-dichlorobenzoate
decyl 2-methoxy-3,6-dichlorobenzoate To effect the method of this invention, sugar beet plants are treated at a comparatively late stage of development with an effective amount of an active compound described above. This treatment is carried out during that stage of development of the sugar beet plant wherein sugar formation takes place. Thus, under normal growing conditions and common cultivation practice the active compounds described can be applied to the sugar beet plants during the period of from about 2 to about 10 weeks before harvesting and preferably during the period of from about 4 to about 7 weeks before harvesting. The use of nitrogen fertilizer, when employed during the cultivation of the sugar beets, is advantageously discontinued before the application of the active compounds of this invention.

The amount of the active compound of this invention required to effectively increase the recoverable sugar from sugar beets can vary somewhat depending on such factors as the time of application, the weather, crop density, and the like. Generally an amount of at least about 0.1 ounces per acre and preferably an amount of from about 0.5 ounces to about 20 ounces per acre can be used. While amounts greater than those mentioned can be used, they will not result in an advantage that would warrant their expense and are therefore not practical.

For practical use in treating sugar beets, the compounds of this invention are generally incorporated into compositions or formulations which comprise an inert carrier and an effective amount of such a compound. These compositions enable the active compounds to be conveniently applied to the sugar beets in any desired quantity. These formulations can be liquids such as solutions, aerosols or emulsifiable concentrates or they can be solids such as dusts, granules or wettable powders.

The preferred compositions are liquid formulations, particularly emulsifiable concentrates. Emulsifiable concentrates comprise an active compound according to this invention and as the inert carrier, a solvent and an emulsifier. Such emulsifiable concentrates can be extended with water and/or oil to any desired concentration of active compound for application as sprays to the sugar beets. The emulsifiers most commonly used in these concentrates are nonionic or mixtures of nonionic with anionic surface-active agents. With the use of some emulsifier systems an inverted emulsion (water-in-oil) can be prepared.

Solid formulations such as dusts, for example, can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

Typical formulations according to the present invention useful for increasing the recoverable sugar in sugar beets are illustrated in the following examples wherein the quantities are in parts by weight.

EXAMPLE 1

PREPARATION OF AN EMULSIFIABLE CONCENTRATES

The following ingredients are blended thoroughly until a homogeneous liquid concentrate is obtained. This concentrate is mixed with water to give an aqueous dispersion containing the desired concentration of the active ingredients for use as a spray.

| | |
|---|---|
| Methyl 2-methoxy-3,6-dichlorobenzoate | 25 |
| Sodium lauryl sulfate | 2 |
| Sodium lignin sulfate | 3 |
| Kerosene | 70 |

EXAMPLE 2

PREPARATION OF A WETTABLE POWDER

The following components are mixed intimately in conventional mixing or blending equipment and are then ground to a powder having an average particle size of less than about 50 microns. The finished powder is dispersed in water to give the desired concentration of active compound.

| | |
|---|---|
| Isopropyl 2-methoxy-3,6-dichlorobenzoate | 50 |
| Fuller's earth | 47 |
| Sodium lauryl sulfate | 2.5 |
| Methyl cellulose | 0.5 |

EXAMPLE 3

PREPARATION OF A DUST

The following ingredients are mixed thoroughly and are then ground to an average particle size of less than about 50 microns to give a dust suitable for application with conventional dusting equipment.

| | |
|---|---|
| Decyl 2-methoxy-3,6-dichlorobenzoate | 10 |
| Powdered talc | 90 |

The effectiveness of the active compounds of this invention for increasing the recoverable sugar in sugar beets was demonstrated in five separate experiments carried out at different times wherein sugar beet plants were sprayed with an appropriately diluted emulsifiable concentrate of the compound methyl 2-methoxy-3,6-dichlorobenzoate. In the first four experiments an application rate of 3 ounces per acre of active compound was used and in the fifth experiment the concentration of active compound was varied from 0.75 ounces to 6 ounces per acre. The recoverable sugar was measured on a percent basis in comparison to untreated controls. The results of these experiments are shown in the following table.

TABLE I

| Experiment No. | Concentration of Test Chemical in ounces/acre | Recoverable Sugar |
| --- | --- | --- |
| 1 | 3 | 118.26 |
| 2 | 3 | 108.69 |
| 3 | 3 | 106.0 |
| 4 | 3 | 109.3 |
| 5 | 0.75 | 103.2 |
| 5 | 1.5 | 102.4 |
| 5 | 3 | 118.7 |
| 5 | 6 | 112.9 |
| Control | | 100.00 |

I claim:

1. A method for increasing the recoverable sugar from sugar beets which comprises contacting the sugar beet plants with at least about 0.1 ounces per acre of an alkyl ester of 2-methoxy-3,6-dichlorobenzoic acid.

2. The method of claim 1 wherein the sugar beet plants are contacted with an alkyl ester of 2-methoxy-3,6-dichlorobenzoic acid during the period of from about 2 to about 10 weeks before harvest.

3. The method of claim 1 wherein the alkyl ester group of 2-methoxy-3,6-dichlorobenzoic acid has from 1 to 10 carbon atoms.

4. The method of claim 1 wherein the ester is methyl 2-methoxy-3,6-dichlorobenzoate.

5. The method of claim 1 wherein the ester is decyl 2-methoxy-3,6-dichlorobenzoate.

6. The method of claim 1 wherein the sugar beet plants are contacted with at least about 0.5 ounces per acre of an alkyl ester of 2-methoxy-3,6-dichlorobenzoic acid.

7. The method of claim 1 wherein the sugar beet plants are contacted with from about 0.5 ounces to about 20 ounces per acre of methyl 2-methoxy-3,6-dichlorobenzoate during the period of from about 4 to about 7 weeks before harvest.

* * * * *